United States Patent
Sugiyama et al.

(10) Patent No.: US 9,451,194 B2
(45) Date of Patent: Sep. 20, 2016

(54) SOLID-STATE IMAGING DEVICE

(71) Applicant: HAMAMATSU PHOTONICS K.K., Hamamatsu-shi, Shizuoka (JP)

(72) Inventors: Yukinobu Sugiyama, Hamamatsu (JP); Tetsuya Abe, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/415,205

(22) PCT Filed: Apr. 4, 2013

(86) PCT No.: PCT/JP2013/060335
§ 371 (c)(1),
(2) Date: Jan. 16, 2015

(87) PCT Pub. No.: WO2014/017127
PCT Pub. Date: Jan. 30, 2014

(65) Prior Publication Data
US 2015/0181144 A1   Jun. 25, 2015

(30) Foreign Application Priority Data

Jul. 27, 2012 (JP) ................................ 2012-167246

(51) Int. Cl.
*H04N 5/335* (2011.01)
*H04N 5/378* (2011.01)

(52) U.S. Cl.
CPC ............ *H04N 5/378* (2013.01); *H04N 5/2176* (2013.01); *H04N 5/23245* (2013.01); *H04N 5/357* (2013.01); *H04N 5/3575* (2013.01)

(58) Field of Classification Search
CPC ...................................................... H04N 5/378
USPC ........................................................ 348/302
See application file for complete search history.

(56) References Cited

U.S. PATENT DOCUMENTS 5,434,619 A  *  7/1995  Yonemoto ..................... 348/241
2010/0327176 A1*  12/2010  Takenaka et al. ............ 250/394

FOREIGN PATENT DOCUMENTS

| JP | H11-252575 | 9/1999 |
| JP | 2006-074497 A | 3/2006 |
| JP | 2006-129221 A | 5/2006 |
| JP | 2007-300521 A | 11/2007 |
| JP | 2009-207048 | 9/2009 |
| JP | 2010-021895 A | 1/2010 |

OTHER PUBLICATIONS

English-language translation of International Preliminary Report on Patentability (IPRP) dated Feb. 5, 2015 that issued in WO Patent Application No. PCT/JP2013/060335.

* cited by examiner

*Primary Examiner* — Roberto Velez
*Assistant Examiner* — Stephen Coleman
(74) *Attorney, Agent, or Firm* — Drinker Biddle & Reath LLP

(57) ABSTRACT

A solid-state imaging device (1) includes a light receiving unit (10), a row selection unit (20), a holding unit (30), a column selection unit (40), a reading unit (50), and a control unit (60). The light receiving unit (10) includes M×N pixel units ($P_{1,1}$ to $P_{M,N}$). The holding unit (30) includes 2N hold circuits ($H_{1,1}$ to $H_{2,N}$). In a first operation mode, the hold circuits ($H_{1,n}$ and $H_{2,n}$) of the holding unit (30) operate in parallel to alternately perform data sampling and alternately perform data output. The reading unit (50) outputs data Dout according to an amount of light incident on a photodiode of the pixel unit ($P_{m,n}$) based on the data alternately output from the hold circuits ($H_{1,n}$ and $H_{2,n}$) of the holding unit (30).

5 Claims, 9 Drawing Sheets form not only highly precise imaging, but also high-speed imaging. However, the solid-state imaging device of the invention disclosed in Patent Literature 1 is limited in performing high-speed imaging. Further, providing two circuits that read data from the pixel unit so as to enable both highly precise imaging and high-speed imaging can be considered, but in this case, a circuit scale increases.
SOLID-STATE IMAGING DEVICE

TECHNICAL FIELD

The present invention relates to a solid-state imaging device.

BACKGROUND ART

A solid-state imaging device includes a light receiving unit including a plurality of pixel units that are arranged one-dimensionally or two-dimensionally, and each pixel unit has a photodiode that generates an amount of charge according to an amount of incident light. Such a solid-state imaging device can acquire a one-dimensional or two-dimensional image. The solid-state imaging device is often required to remove a noise component from data output from each pixel unit and to achieve highly precise imaging.

An invention intended to enable highly precise imaging is disclosed in Patent Literature 1. In the solid-state imaging device of the invention disclosed in this literature, a difference between data of only a noise component output from a pixel unit and data in which the noise component is superimposed on a signal component output from the pixel unit is obtained to thereby obtain data of the signal component from which the noise component has been removed and perform highly precise imaging.

CITATION LIST

Patent Literature

Patent Literature 1: Japanese Patent Laid-Open Publication No. 2006-129221

SUMMARY OF INVENTION

Technical Problem

The solid-state imaging device may be required to perform not only highly precise imaging, but also high-speed imaging. However, the solid-state imaging device of the invention disclosed in Patent Literature 1 is limited in performing high-speed imaging. Further, providing two circuits that read data from the pixel unit so as to enable both highly precise imaging and high-speed imaging can be considered, but in this case, a circuit scale increases.

The present invention has been made to solve the above problem, and an object of the present invention is to provide a solid-state imaging device capable of achieving both of highly precise imaging and high-speed imaging and suppressing increase in circuit scale.

Solution to Problem

The solid-state imaging device of the present invention includes (1) a light receiving unit including M×N pixel units $P_{1,1}$ to $P_{M,N}$ arranged in M rows and N columns, each pixel unit $P_{m,n}$ including a photodiode that generates an amount of charge according to an amount of incident light, and a charge accumulation portion that accumulates the charge, and the light receiving unit outputting data according to an accumulation charge amount in the charge accumulation portion; (2) a holding unit including 2N hold circuits $H_{1,1}$ to $H_{2,N}$, each of the hold circuits $H_{1,n}$ and $H_{2,n}$ sampling, holding and outputting data output from any one of the M pixel units $P_{1,n}$ to $P_{M,n}$ on an $n^{th}$ column of the light receiving unit; (3) a reading unit configured to receive data output from both or one of the hold circuits $H_{1,n}$ and $H_{2,n}$ of the holding unit, and output data according to an amount of light incident on the photodiode of the pixel unit $P_{m,n}$ based on the received data; and (4) a control unit configured to control an operation of each of the holding unit and the reading unit. Here, M is an integer equal to or more than 1, N is an integer equal to or more than 2, m is an integer ranging from 1 to M, and n is an integer ranging from 1 to N.

Further, in the solid-state imaging device of the present invention, the control unit (a) causes, in a first operation mode, the hold circuits $H_{1,n}$ and $H_{2,n}$ of the holding unit to operate in parallel to alternately perform data sampling and alternately perform data output, and the reading unit to output the data according to an amount of light incident on the photodiode of the pixel unit $P_{m,n}$ based on the data alternately output from the hold circuits $H_{1,n}$ and $H_{2,n}$ of the holding unit, and (b) causes, in a second operation mode, the pixel unit $P_{m,n}$ of the light receiving unit to output data of a noise component at a first time and output data according to the accumulation charge amount at a second time, one of the hold circuits $H_{1,n}$ and $H_{2,n}$ of the holding unit to perform data sampling at the first time and the other to perform data sampling at the second time, and the reading unit to output the data according to an amount of light incident on the photodiode of the pixel unit $P_{m,n}$ based on a difference between the data output from the respective hold circuits $H_{1,n}$ and $H_{2,n}$ of the holding unit.

In the solid-state imaging device of the present invention, the control unit may cause, in the first operation mode, for some of N columns of the light receiving units, the hold circuits $H_{1,n}$ and $H_{2,n}$ of the holding unit to operate in parallel to alternately perform data sampling and alternately perform data output, and the reading unit to output the data according to an amount of light incident on the photodiode of the pixel unit $P_{m,n}$ based on the data alternately output from the hold circuits $H_{1,n}$ and $H_{2,n}$ of the holding unit.

In the solid-state imaging device of the present invention, the reading unit may include: (1) an amplifier including an inversion input terminal, a non-inversion input terminal, an inversion output terminal and a non-inversion output terminal, the amplifier receiving data output from one of the hold circuits $H_{1,n}$ and $H_{2,n}$ of the holding unit at the inversion input terminal and receiving data output from the other at the non-inversion input terminal; (2) a first capacitor provided between the inversion input terminal and the non-inversion output terminal of the amplifier; (3) a second capacitor provided between the non-inversion input terminal and the inversion output terminal of the amplifier; (4) a first initialization unit configured to initialize a potential of each of the inversion input terminal and the non-inversion output terminal of the amplifier; and (5) a second initialization unit configured to initialize a potential of each of the non-inversion input terminal and the inversion output terminal of the amplifier.

The reading unit may further include an AD conversion unit that has a first input terminal and a second input terminal, receives the data output from one of the non-inversion output terminal and the inversion output terminal of the amplifier at the first input terminal, receives the data output from the other at the second input terminal, and outputs a digital value according to a difference between the data input at the first input terminal and the second input terminal. The reading unit may further include an output switching unit that switches a connection between the non-inversion output terminal and the inversion output terminal of the amplifier and the first input terminal and the second input terminal of the AD conversion unit. Further, the reading unit may further include an input switching unit that switches a connection between the hold circuits $H_{1,n}$ and $H_{2,n}$ of the holding unit and the inversion input terminal and the non-inversion input terminal of the amplifier.

Advantageous Effects of Invention

The solid-state imaging device of the present invention can achieve both of highly precise imaging and high-speed imaging and can suppress increase in circuit scale.

DESCRIPTION OF EMBODIMENTS

Hereinafter, embodiments of the present invention will be described in detail with reference to the accompanying drawings. Further, the same elements are denoted with the same signs in description of the drawings, and repeated description will be omitted.

Figure 1:
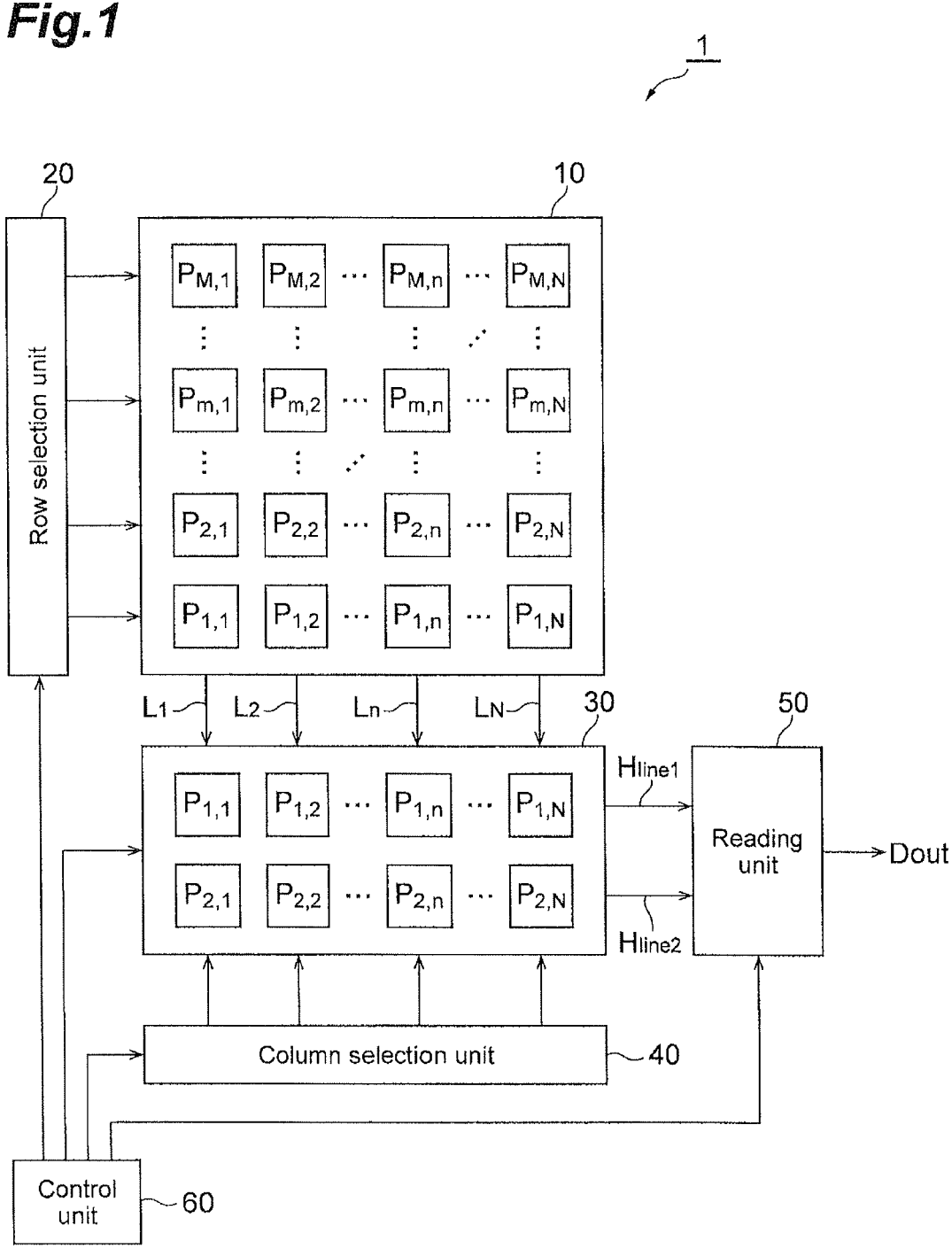
FIG. 1 is a diagram illustrating a configuration of a solid-state imaging device 1 of the present embodiment.

FIG. 1 is a diagram illustrating a configuration of a solid-state imaging device 1 of this embodiment. The solid-state imaging device 1 includes a light receiving unit 10, a row selection unit 20, a holding unit 30, a column selection unit 40, a reading unit 50, and a control unit 60.

The light receiving unit 10 includes M×N pixel units $P_{1,1}$ to $P_{M,N}$. The M×N pixel units $P_{1,1}$ to $P_{M,N}$ have a common configuration, and are arranged in M rows and N columns. Each pixel unit $P_{m,n}$ is located in an $m^{th}$ row and an $n^{th}$ column. Here, M is an integer equal to or more than 1, N is an integer equal to or more than 2, m is an integer ranging from 1 to M, and n is an integer ranging from 1 to N. Further, when M=1, 1×N pixel units $P_{1,1}$ to $P_{1,N}$ are arranged one-dimensionally. When M≥2, the M×N pixel units $P_{1,1}$ to $P_{M,N}$ are arranged two-dimensionally. Hereinafter, a case in which M≥2 will be described.

Each pixel unit $P_{m,n}$ includes a photodiode that generates an amount of charge according to an amount of incident light, and a charge accumulation portion that accumulates the charge. Each pixel unit $P_{m,n}$ accumulates the charge generated by the photodiode in the charge accumulation portion, and outputs data according to an amount of accumulated charge in the charge accumulation portion to a reading signal line $L_n$ based on various control signals received from the row selection unit 20 via a control signal line.

The row selection unit 20 outputs various control signals for controlling an operation of each pixel unit $P_{m,n}$ of the light receiving unit 10. More specifically, the row selection unit 20 causes each pixel unit $P_{m,n}$ to accumulate the charge generated by the photodiode in the charge accumulation portion. Further, the row selection unit 20 selects each row in the light receiving unit 10, and causes each pixel unit $P_{m,n}$ in each row to output the data according to the accumulation charge amount in the charge accumulation portion to the reading signal line $L_n$.

The holding unit 30 includes 2N hold circuits $H_{1,1}$ to $H_{2,N}$. The 2N hold circuits $H_{1,1}$ to $H_{2,N}$ have a common configuration. The hold circuits $H_{1,n}$ to $H_{2,n}$ are connected to the reading signal line $L_n$ and sample and hold data that is output from the respective pixel units $P_{m,n}$ in the $m^{th}$ row in the light receiving unit 10 selected by the row selection unit 20 to the reading signal line $L_n$. The hold circuit $H_{1,n}$ outputs the held data to a signal reading line Hline1. The hold circuit $H_{2,n}$ outputs the held data to a signal reading line Hline2. Operation timings of the respective hold circuits $H_{1,n}$ and $H_{2,n}$ are different from each other.

The column selection unit 40 outputs various control signals for controlling the operation of the 2N hold circuits $H_{1,1}$ to $H_{2,N}$ of the holding unit 30. More specifically, the column selection unit 40 causes each hold circuit to perform data sampling at a predetermined time and perform data output at a predetermined time.

The reading unit 50 receives the data output from both or one of the hold circuits $H_{1,n}$ and $H_{2,n}$ of the holding unit 40, and outputs data Dout according to an amount of light incident on the photodiode of the pixel unit $P_{m,n}$ based on the received data.

The control unit 60 controls an operation of each of the row selection unit 20, the holding unit 30, the column selection unit 40, and the reading unit 50. The control unit 60 controls an operation of the light receiving unit 10 by controlling the operation of the row selection unit 20, and controls the operation of the holding unit 30 by controlling the operation of the column selection unit 40.

Figure 2:
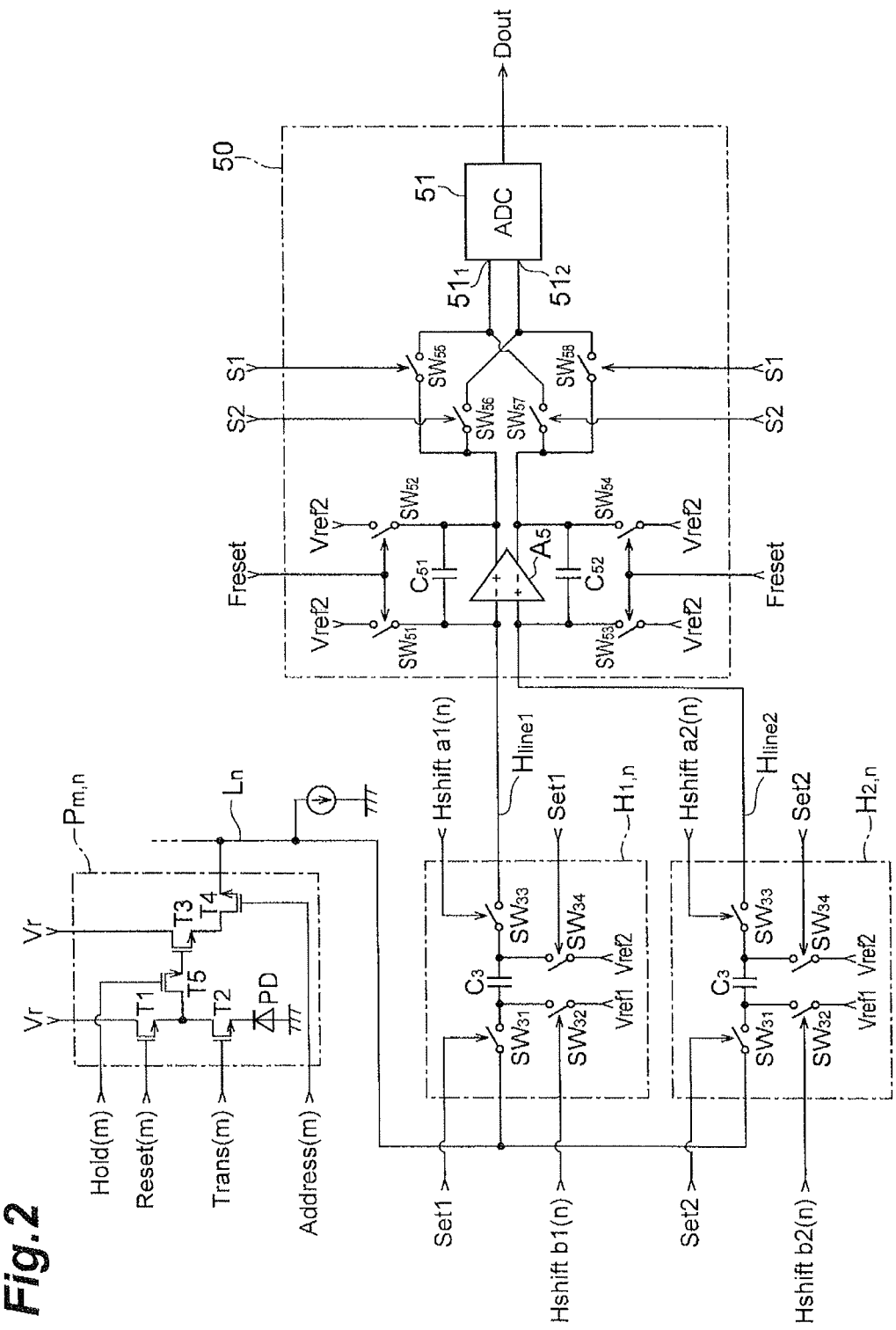
FIG. 2 is a diagram illustrating a circuit configuration of each of a pixel unit $P_{m,n}$, hold circuits $H_{1,n}$ and $H_{2,n}$, and a reading unit 50 of the solid-state imaging device 1 of this embodiment.

FIG. 2 is a diagram illustrating a circuit configuration of each of the pixel unit $P_{m,n}$ the hold circuits $H_{1,n}$ and $H_{2,n}$ and the reading unit 50 of the solid-state imaging device 1 of this embodiment. In FIG. 2, the pixel unit $P_{m,n}$ in an $m^{th}$ row and an $n^{th}$ column among the M×N pixel units $P_{1,1}$ to $P_{M,N}$ in the light receiving unit 10 is shown as a representative, and the hold circuits $H_{1,n}$ and $H_{2,n}$ in the holding unit 30 connected to the pixel unit $P_{m,n}$ by the reading signal line $L_n$ are shown.

Each pixel unit $P_{m,n}$ is a pixel unit in an APS (Active Pixel Sensor) scheme, and includes a photodiode PD and five MOS transistors T1, T2, T3, T4, and T5. As illustrated in FIG. 2, the transistor T1, the transistor T2, and the photodiode PD are sequentially connected in series, a reference voltage Vr is input to a drain terminal of the transistor T1, and an anode terminal of the photodiode PD is grounded. A connection point between the transistor T1 and the transistor T2 is connected to a gate terminal of the transistor T3 via the transistor T5.

The reference voltage Vr is input to a drain terminal of the transistor T3. A source terminal of the transistor T3 is connected to a drain terminal of the transistor T4. A source terminal of the transistor T4 of each pixel unit $P_{m,n}$ is connected to the reading signal line $L_n$. A constant current source is connected to the reading signal line $L_n$.

A Reset(m) signal output from the row selection unit 20 is input to a gate terminal of the transistor T1 for resetting of each pixel unit $P_{m,n}$. A Trans(m) signal output from the row selection unit 20 is input to a gate terminal of the transistor T2 for transfer of each pixel unit $P_{m,n}$. A Hold(m) signal output from the row selection unit 20 is input to a gate terminal of the transistor T5 for holding of each pixel unit $P_{m,n}$. An Address(m) signal output from the row selection unit 20 is input to a gate terminal of the transistor T4 for output selection of each pixel unit $P_{m,n}$. These control signals (the Reset(m) signal, the Trans(m) signal, the Hold (m) signal, and the Address(m) signal) are commonly input from the row selection unit 20 to the N pixel units $P_{m,1}$ to $P_{m,N}$ in the $m^{th}$ row.

When the Reset(m) signal, the Trans(m) signal, and the Hold(m) signal are at a high level, a junction capacitance portion of the photodiode PD is discharged, and a diffusion area (charge accumulation portion) connected to the gate terminal of the transistor T3 is discharged. When the Trans (m) signal is at a low level, the charge generated by the photodiode PD is accumulated in the junction capacitance portion. When the Reset(m) signal is at a low level and the Trans(m) signal and the Hold(m) signal are at a high level, the charge accumulated in the junction capacitance portion of the photodiode PD is transferred to and accumulated in the diffusion area (charge accumulation portion) connected to the gate terminal of the transistor T3.

When the Address(m) signal is at a high level, data (data of a signal component on which a noise component is superimposed) according to an amount of charge accumulated in the diffusion area (charge accumulation portion) connected to the gate terminal of the transistor T3 is output to the reading signal line $L_n$ via the transistor T4. That is, the transistor T4 serves as a switch for outputting the data according to the amount of accumulated charge in the charge accumulation portion to the reading signal line $L_n$. Further, when the charge accumulation portion is in a discharge state, data of only the noise component is output to the reading signal line $L_n$ via the transistor T4.

The hold circuit $H_{1,n}$ includes a capacitance element $C_3$ and four switches $SW_{31}$ to $SW_{34}$. In the hold circuit $H_{1,n}$, one terminal of the capacitance element $C_3$ is connected to the reading signal line $L_n$ via the switch $SW_{31}$, and a reference voltage Vref1 is input via the switch $SW_{32}$. The other terminal of the capacitance element $C_3$ is connected to the reading signal line Hline1 via the switch $SW_{33}$, and a reference voltage Vref2 is input via the switch $SW_{34}$. The switches $SW_{31}$ and $SW_{34}$ are opened or closed according to a level of the Set1 signal output from the control unit 60. The switch $SW_{32}$ is opened or closed according to a level of an Hshift b1(n) signal output from the column selection unit 40. The switch $SW_{33}$ is opened or closed according to a level of an Hshift a1(n) signal output from the column selection unit 40. The Set1 signal is commonly input to the N hold circuits $H_{1,1}$ to $H_{1,N}$.

When the switches $SW_{32}$ and $SW_{33}$ are opened at low levels of the Hshift a1(n) signal and the Hshift b1(n) signal, if the Set1 signal turns from a high level to a low level at a predetermined time and the switches $SW_{31}$ and $SW_{34}$ turn from a closed state to an opened state, the hold circuit $H_{1,n}$ accumulates the amount of charge according to the data output to the reading signal line $L_n$ at that time in the capacitance element $C_3$ and performs data sampling. Thereafter, when the Hshift a1(n) signal turns to a high level and the switch $SW_{33}$ turns to a closed state, and the Hshift b1(n) signal turns to a high level and the switch $SW_{32}$ turns to a closed state, the hold circuit $H_{1,n}$ outputs the data held in the capacitance element $C_3$ to the reading signal line Hline1.

The hold circuit $H_{2,n}$ also includes a capacitance element $C_3$ and four switches $SW_{31}$ to $SW_{34}$. In the hold circuit $H_{2,n}$ one terminal of the capacitance element $C_3$ is connected to the reading signal line $L_n$ via the switch $SW_{31}$, and the reference voltage Vref1 is input via the switch $SW_{32}$. The other terminal of the capacitance element $C_3$ is connected to the reading signal line Hline2 via the switch $SW_{33}$, and the reference voltage Vref2 is input via the switch $SW_{34}$. The switches $SW_{31}$ and $SW_{34}$ are opened or closed according to the level of the Set2 signal output from the control unit 60. The switch $SW_{32}$ is opened or closed according to a level of an Hshift b2(n) signal output from the column selection unit 40. The switch $SW_{33}$ is opened or closed according to a level of an Hshift a2(n) signal output from the column selection unit 40. The Set2 signal is commonly input to the N hold circuits $H_{2,1}$ to $H_{2,N}$.

When the switches $SW_{32}$ and $SW_{33}$ are opened at low levels of the Hshift a2(n) signal and the Hshift b2(n) signal, if the Set2 signal turns from the high level to the low level at a predetermined time and the switches $SW_{31}$ and $SW_{34}$ turn from a closed state to an opened state, the hold circuit $H_{2,n}$ accumulates the amount of charge according to the data output to the reading signal line $L_n$ at that time in the capacitance element $C_3$, and performs data sampling. Thereafter, when the Hshift a2(n) signal turns to a high level and the switch $SW_{33}$ turns to a closed state, and the Hshift b2(n) signal turns to a high level and the switch $SW32$ turns to a closed state, the hold circuit $H_{2,n}$ outputs the data held in the capacitance element $C_3$ to the reading signal line Hline2.

The reading unit 50 includes a full differential amplifier $A_5$, capacitance elements $C_{51}$ and $C_{52}$, switches $SW_{51}$ to $SW_{34}$, switches $SW_{55}$ to $SW_{58}$, and an AD conversion unit 51.

The amplifier $A_5$ has an inversion input terminal, a non-inversion input terminal, an inversion output terminal, and a non-inversion output terminal. The capacitance element $C_{51}$ is provided between the inversion input terminal and the non-inversion output terminal of the amplifier $A_5$. The capacitance element $C_{52}$ is provided between the non-inversion input terminal and the inversion output terminal of the amplifier $A_5$. Capacitance values of the capacitance elements $C_{51}$ and $C_{52}$ are equal to each other. The amplifier $A_5$ receives data output from the hold circuit $H_{1,n}$ to the reading signal line Hline1 at the inversion input terminal and receives data output from the hold circuit $H_{2,n}$ to the reading signal line Hline2 at the non-inversion input terminal.

The reference potential Vref2 is input to the inversion input terminal of the amplifier $A_5$ via the switch $SW_{51}$. The reference potential Vref2 is input to the non-inversion output terminal of the amplifier $A_5$ via the switch $SW_{52}$. The reference potential Vref2 is input to the non-inversion input terminal of the amplifier $A_5$ via the switch $SW_{53}$. The reference potential Vref2 is input to the inversion output terminal of the amplifier $A_5$ via the switch $SW_{54}$. When a Freset signal given from the control unit 60 is at a high level, the switches $SW_{51}$ and $SW_{52}$ are closed and respective potentials of the inversion input terminal and the non-inversion output terminal of the amplifier $A_5$ can be initialized. When the Freset signal given from the control unit 60 is at a high level, the switch $SW_{53}$ and $SW_{54}$ are closed and respective potentials of the non-inversion input terminal and the inversion output terminal of the amplifier $A_5$ can be initialized.

The AD conversion unit 51 has a first input terminal $51_1$ and a second input terminal $51_2$, and outputs a digital value Dout according to a difference between data input to the first input terminal $51_1$ and data input to the second input terminal $51_2$.

The switch $SW_{55}$ is provided between the non-inversion output terminal of the amplifier $A_5$ and the first input terminal $51_1$ of the AD conversion unit 51. The switch $SW_{56}$ is provided between the non-inversion output terminal of the amplifier $A_5$ and the second input terminal $51_2$ of the AD conversion unit 51. The switch $SW_{57}$ is provided between the inversion output terminal of the amplifier $A_5$ and the first input terminal $51_1$ of the AD conversion unit 51. The switch $SW_{58}$ is provided between the inversion output terminal of the amplifier $A_5$ and the second input terminal $51_2$ of the AD conversion unit 51.

When the S1 signal given from the control unit 60 is at a high level, the switches $SW_{55}$ and $SW_{58}$ are closed. When the S2 signal given from the control unit 60 is at a high level, the switches $SW_{56}$ and $SW_{57}$ are closed. When one of the S1 signal and the S2 signal is at a high level, the other is at a low level, and when either of the switches $SW_{55}$ and $SW_{58}$ and the switches $SW_{56}$ and $SW_{57}$ is in a closed state, the other is in an opened state. The switches SW55 to SW58 constitute an output switching unit that switches a connection between the non-inversion output terminal and the inversion output terminal of the amplifier $A_5$ and the first input terminal $51_1$ and the second input terminal $51_2$ of the AD conversion unit 51.

Figure 3:
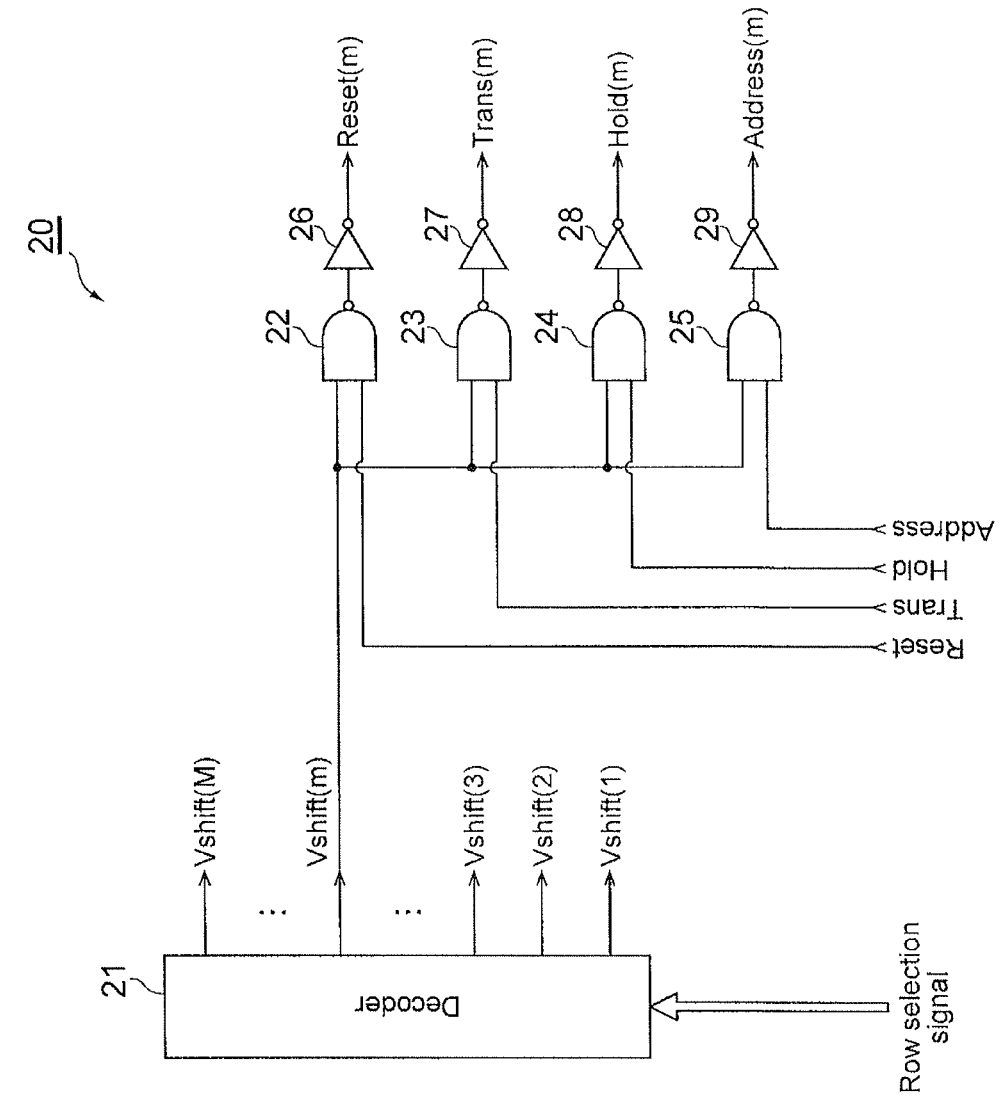
FIG. 3 is a diagram illustrating a circuit configuration of a row selection unit 20 of the solid-state imaging device 1 of this embodiment.

FIG. 3 is a diagram illustrating a circuit configuration of the row selection unit 20 of the solid-state imaging device 1 of this embodiment. The row selection unit 20 receives the row selection signal, the Reset signal, the Trans signal, the Hold signal, and the Address signal output from the control unit 60. The row selection signal is a signal for selecting the row on which the charge accumulation operation, the data output operation, and the like are to be performed among the M rows of the light receiving unit 10. The decoder 21 outputs respective signals vshift(1) to vshift(M) having levels that are set based on the input row selection signal. When the row selected by the input row selection signal is the $m^{th}$ row, the vshift(m) signal is selectively at a high level.

In the row selection unit 20, M sets of NAND circuits 22 to 25 and INV circuits 26 to 29 are provided, but only the set to which the vshift(m) signal is input is illustrated in FIG. 3. The NAND circuit 22 and the INV circuit 26 output a Reset(m) signal which is a logical product of the vshift(m) signal and the Reset signal. The NAND circuit 23 and the INV circuit 27 output a Trans(m) signal which is a logical product of the vshift(m) signal and the Trans signal. The NAND circuit 24 and the INV circuit 28 output a Hold(m) signal which is a logical product of the vshift(m) signal and the Hold signal. The NAND circuit 25 and the INV circuit 29 output an Address(m) signal which is a logical product of the vshift(m) signal and the Address signal.

Figure 4:
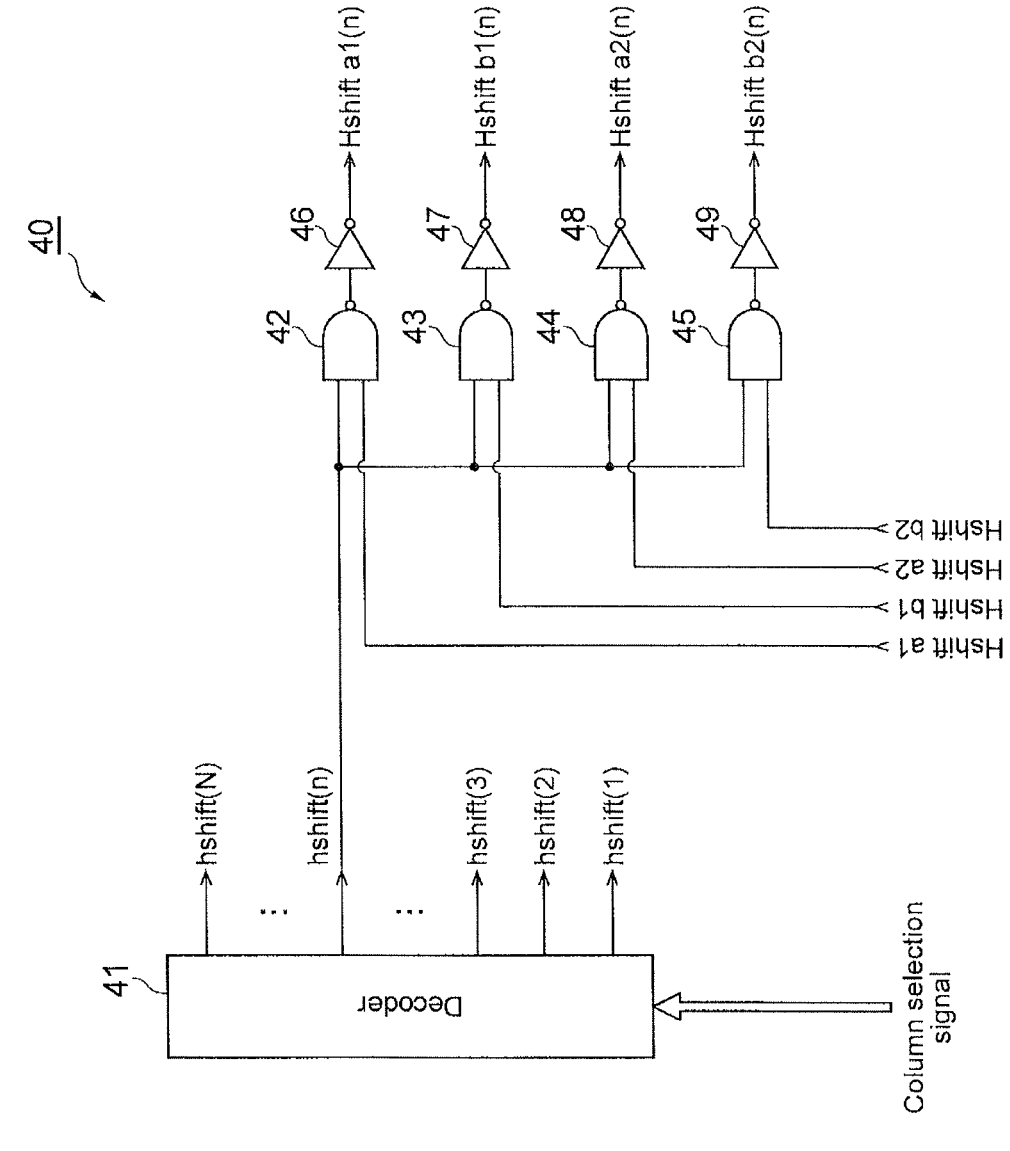
FIG. 4 is a diagram illustrating a circuit configuration of a column selection unit 40 of the solid-state imaging device 1 of this embodiment.

FIG. 4 is a diagram illustrating a circuit configuration of the column selection unit 40 of the solid-state imaging device 1 of this embodiment. The column selection unit 40 receives the column selection signal, the Hshift a1 signal, the Hshift b1 signal, the Hshift a2 signal and the Hshift b2 signal output from the control unit 60. The column selection signal is a signal for selecting a column on which data output is to be performed among the N columns of the holding unit 30. A decoder 41 outputs the respective signals hshift(1) to hshift(N) having levels set based on the input column selection signal. When the column selected by the input column selection signal is an nib column, the hshift(n) signal is selectively at a high level.

In the column selection unit 40, N sets of NAND circuits 42 to 45 and INV circuits 46 to 49 are provided, but only the set to which the hshift(n) signal is input is illustrated in FIG. 4. The NAND circuit 42 and the INV circuit 46 output a Hshift a1(n) signal which is a logical product of the hshift(n) signal and the Hshift a1 signal. The NAND circuit 43 and the INV circuit 47 output an Hshift b1(n) signal which is a logical product of the hshift(n) signal and the Hshift b1 signal. The NAND circuit 44 and the INV circuit 48 output an Hshift a2(n) signal which is a logical product of the hshift(n) signal and the Hshift a2 signal. The NAND circuit 45 and the INV circuit 49 output an Hshift b2(n) signal which is a logical product of the hshift(n) signal and the Hshift b2 signal.

Figure 5:
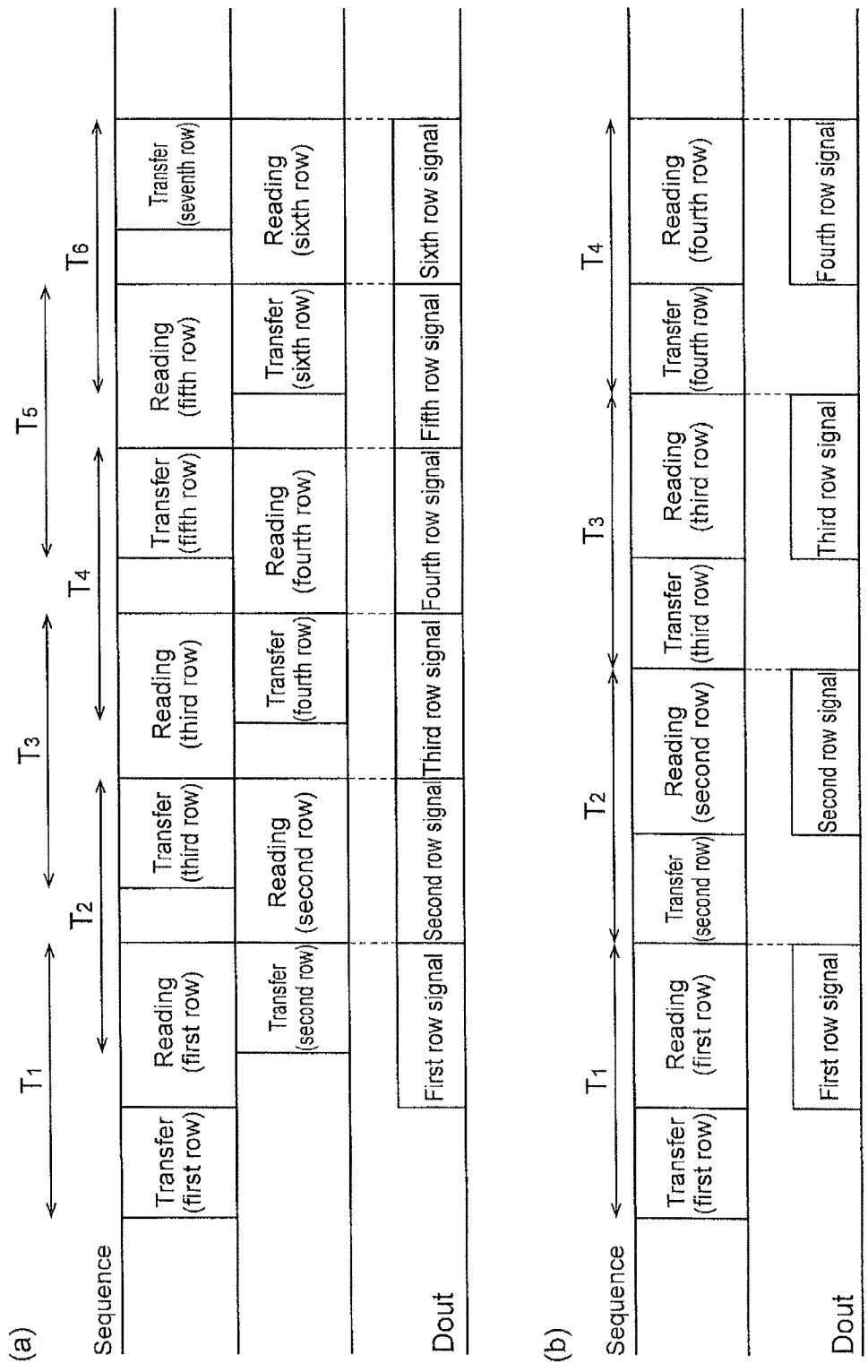
FIG. 5 is a diagram illustrating an overview of an operation of the solid-state imaging device 1 of this embodiment.

FIG. 5 is diagram illustrating an overview of the operation of the solid-state imaging device 1 of this embodiment. The solid-state imaging device 1 has at least a first operation mode and a second operation mode in which aspects of the control by the control unit 60 differ from each other. In FIG. 5, "transfer" refers to sampling the data output from the pixel unit $P_{m,n}$ on a certain row of the light receiving unit 10 using the hold circuit $H_{1,n}$ or Hz, of the holding unit 30. "Reading" refers to reading the data held by the hold circuit $H_{1,n}$ or $H_{2,n}$ of the holding unit 30 as the data Dout using the reading unit 50.

In the first operation mode illustrated in FIG. 5(a), the hold circuits $H_{1,n}$ and $H_{2,n}$ of the holding unit 30 operate in parallel to alternately perform data sampling and alternately output data. That is, a period in which one of the hold circuits $H_{1,n}$ and $H_{2,n}$ performs the data sampling and a period in which the other performs the data output at least partially overlap. According to which of the hold circuits $H_{1,n}$ and $H_{2,n}$ performs the data output, any one of the S1 signal and the S2 signal is at a high level and either of the switches $SW_{55}$ and $SW_{58}$ and the switches $SW_{56}$ and $SW_{57}$ enters a closed state. Also, the reading unit 50 outputs the data Dout according to the amount of light incident on the photodiode of the pixel unit $P_{m,n}$ based on the data alternately output from the hold circuits $H_{1,n}$ and $H_{2,n}$ of the holding unit 30.

As illustrated in FIG. 5(a), when an integer from 1 to N/2 is assumed to be k, data of each pixel unit $P_{2k-1,n}$ on the $(2k-1)^{th}$ row is sampled by the hold circuit $H_{1,n}$, and the data held by the hold circuit $H_{1,n}$ is read as the data Dout through the reading unit 50 during a period $T_{2k-1}$. During a period $T_{2k}$, data of each pixel unit $P_{2k,n}$ on the $2k^{th}$ row is sampled by the hold circuit $H_{2,n}$, and the data held by the hold circuit $H_{2,n}$ is read as the data Dout through the reading unit 50. A period of the data output by the hold circuit $H_{1,n}$ during the period $T_{2k-1}$ and a period of the data sampling by the hold circuit Hz, during the period $T_{2k}$ at least partially overlap. A period of data output by the hold circuit $H_{2,n}$ during the period $T_{2k}$ and a period of data sampling by the hold circuit $H_{1,n}$ during the period $T_{2k+1}$ at least partially overlap.

In the second operation mode shown in FIG. 5(b), the pixel unit $P_{m,n}$ of the light receiving unit 10 outputs data of a noise component at a first time and outputs the data according to the accumulation charge amount at a second time. One of the hold circuits $H_{1,n}$ and $H_{2,n}$ of the holding unit 30 performs data sampling at the first time, and the other performs data sampling at the second time. One of the S1 signal and the S2 signal remains at a high level, the other remains at a low level, either of the switches $SW_{55}$ and $SW_{58}$ and the switches $SW_{56}$ and $SW_{57}$ remains in a closed state and the other remains in an opened state. Also, the reading unit 50 outputs the data Dout according to the amount of light incident on the photodiode of the pixel unit $P_{m,n}$ based on a difference between the data output from the respective hold circuits $H_{1,n}$ and $H_{2,n}$ of the holding unit 30.

As illustrated in FIG. 5(*b*), during a period $T_{m,n}$ the data of the noise component of each pixel unit $P_{m,n}$ in the $m^{th}$ row is sampled by the hold circuit $H_{1,n}$ at the first time, the data according to the accumulation charge amount of each pixel unit $P_{m,n}$ in the $m^{th}$ row is sampled by the hold circuit $H_{2,n}$ at the second time, and then the difference between the data held by the respective hold circuits $H_{1,n}$ and $H_{2,n}$ is read as the data Dout from the reading unit 50. Data sampling and data output are performed during a period $T_{m+1}$, subsequent to the data sampling and the data output during the period $T_m$.

Further, in both the first operation mode and the second operation mode, the rolling shutter scheme and the global shutter scheme are both possible. In the rolling shutter scheme, the charge accumulation period of each row of the light receiving unit 10 is shifted by a constant period of time. In the global shutter scheme, the charge accumulation period is common among all the rows of the light receiving unit 10.

Figure 6:
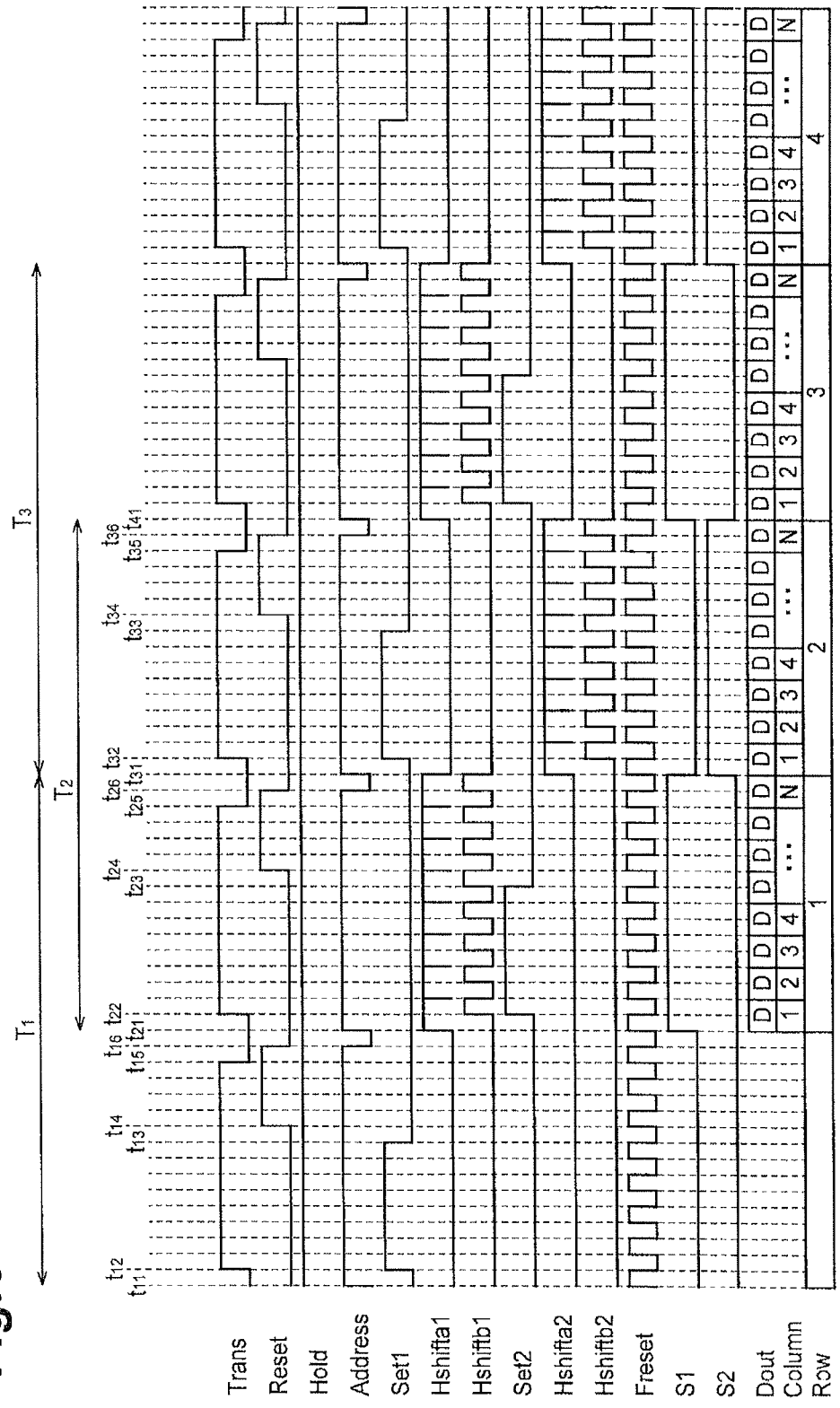
FIG. 6 is a timing chart illustrating an operation (rolling shutter scheme) in a first operation mode of the solid-state imaging device 1 of this embodiment.
Figure 7:
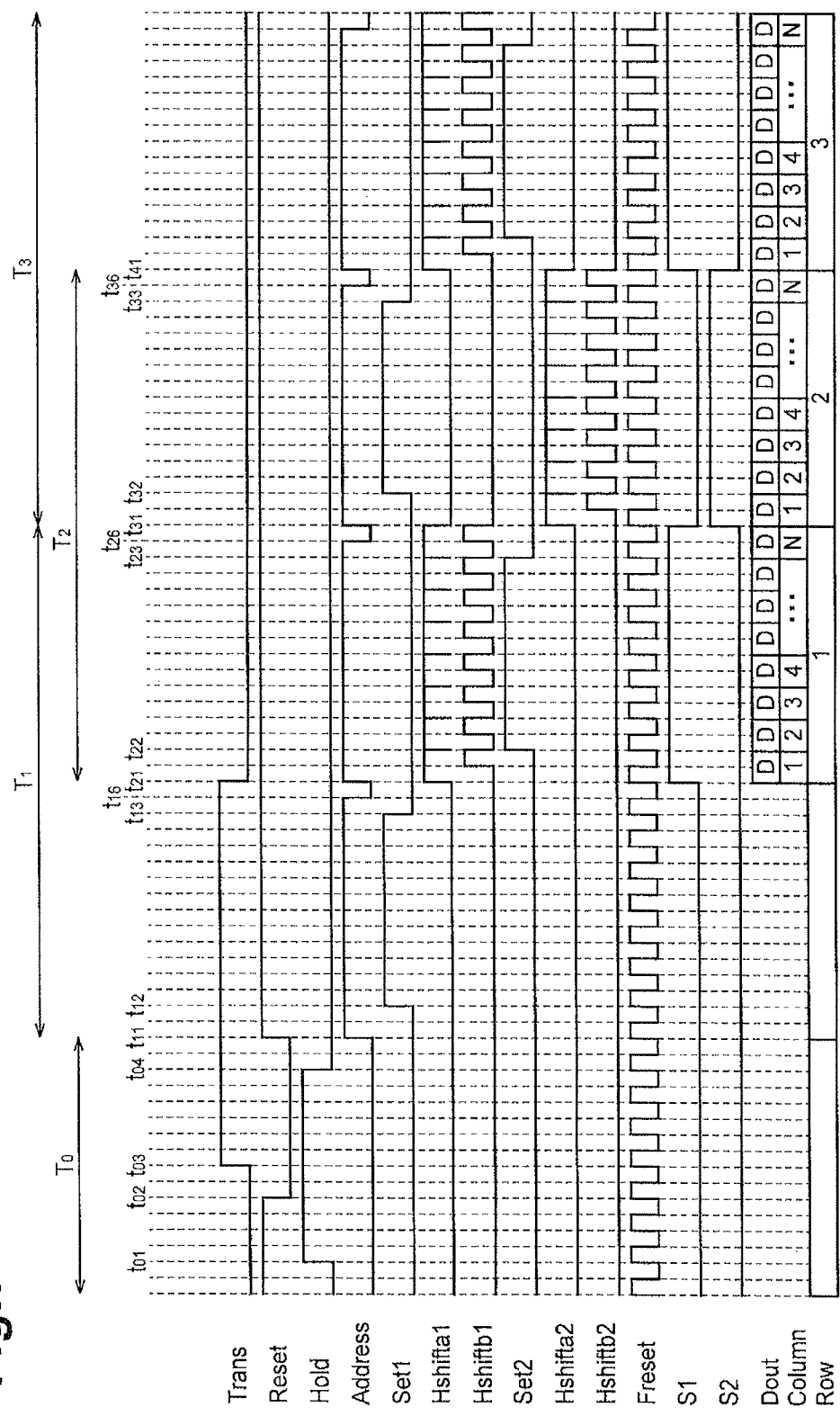
FIG. 7 is a timing chart illustrating an operation (global shutter scheme) in the first operation mode of the solid-state imaging device 1 of this embodiment.
Figure 8:
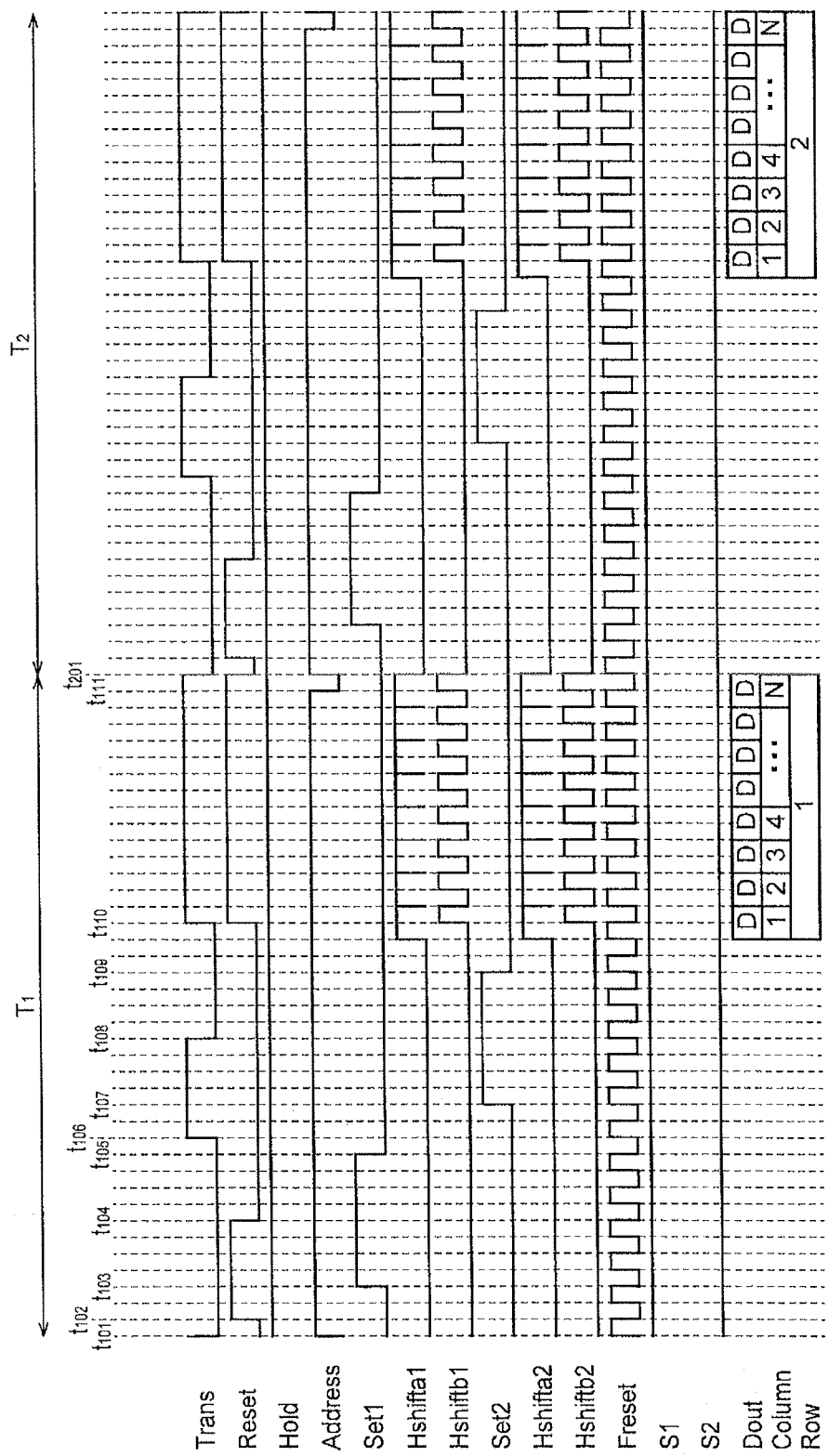
FIG. 8 is a timing chart illustrating an operation (rolling shutter scheme) in a second operation mode of the solid-state imaging device 1 of this embodiment.

Hereinafter, details of the operation of the solid-state imaging device 1 of this embodiment will be described with reference to FIGS. 6 to 8. FIG. 6 illustrates an operation (rolling shutter scheme) in the first operation mode. FIG. 7 illustrates an operation (global shutter scheme) in the first operation mode. FIG. 8 illustrates an operation (rolling shutter scheme) in the second operation mode. The Trans signal, the Reset signal, the Hold signal, and the Address signal used for control of the operation of the pixel unit $P_{m,n}$, the Set1 signal, the Hshift a1 signal, and the Hshift b1 signal used for control of the operation of the hold circuit $H_{1,n}$, the Set2 signal, the Hshift a2 signal, and the Hshift b2 signal used for control of the operation of the hold circuit $H_{2,n}$, the Freset signal, the S1 signal, and the S2 signal used for control of the operation of the reading unit 50, and the data Dout output from the reading unit 50 are sequentially illustrated in FIGS. 6 to 8.

FIG. 6 is a timing chart illustrating the operation (rolling shutter scheme) in the first operation mode of the solid-state imaging device 1 of this embodiment.

A period $T_1$ includes a period from time $t_{11}$ to time $t_{31}$. Data of each pixel unit $P_{1,n}$ in the first row is sampled by the hold circuit $H_{1,n}$ during a period from time $t_{11}$ to time $t_{16}$ in the above period, and the data held by each hold circuit $H_{1,n}$, is read as the data Dout through the reading unit 50 during a period from time $t_{21}$ to time $t_{31}$. In this case, output data Dout indicates an amount of light incident on the photodiodes PD of the N pixel units $P_{1,1}$ to $P_{1,N}$ in the first row.

A period $T_2$ includes a period from time $t_{21}$ to time $t_{41}$. Data of each pixel unit $P_{2,n}$ in the second row is sampled by the hold circuit $H_{2,n}$ during a period from time $t_{21}$ to time $t_{26}$ in the above period, and the data held by each hold circuit $H_{2,n}$ is read as the data Dout through the reading unit 50 during a period from time $t_{31}$ to time $t_{41}$. In this case, the output data Dout indicates the amount of light incident on the photodiodes PD of the N pixel units $P_{2,1}$ to $P_{2,N}$ in the second row.

The same operation is repeated for each subsequent row, and the hold circuits $H_{1,n}$ and $H_{2,n}$ operate in parallel to alternately perform data sampling and alternately perform data output. The operation during each period $T_m$ is common except that the hold circuits $H_{1,n}$ a and $H_{2,n}$ are alternately used. Hereinafter, the operation in the period $T_1$ will be described.

The Address(1) signal turns to a high level at time $t_{11}$, the Trans(1) signal and the Set1 signal turn to a high level at time $t_{12}$, and the Set1 signal turns to a low level at time $t_{13}$. During this time, the Reset(1) signal remains at a low level, and the Hold(1) signal remains at a high level. Therefore, in each of the N pixel units $P_{1,1}$ to $P_{1,N}$ in the first row, the charge accumulated in the junction capacitance portion of the photodiode PD is transferred to and accumulated in the diffusion area (charge accumulation portion) connected to the gate terminal of the transistor T3 after time $t_{12}$. Data according to an amount of accumulated charge is output to the reading signal line $L_n$ via the transistor T4 and input to the hold circuit $H_{1,n}$. Also, in the hold circuit $H_{1,n}$ the switches $SW_{31}$ and $SW_{34}$ turn to an opened state, and the data output to the reading signal line $L_n$ is sampled and held at time $t_{13}$ at which the Set1 signal turns to the low level.

After the data sampling is performed by the hold circuit $H_{1,n}$, the Reset(1) signal turns to a high level at time $t_{14}$, the Trans(1) signal turns to a low level at time $t_{15}$, and the Reset(1) signal and the Address(1) signal turn to a low level at time $t_{16}$. During a period in which the Trans(1) signal, the Reset(1) signal, and the Hold(1) signal are at a high level, the junction capacitance portion of the photodiode PD is discharged and the diffusion area (charge accumulation portion) connected to the gate terminal of the transistor T3 is also discharged in each of the N pixel units $P_{1,1}$ to $P_{1,N}$ in the first row. Thereafter, the Trans(1) signal and the Reset(1) signal are at a low level, and the charge generated in the photodiode PD according to light incidence is accumulated in the junction capacitance portion of the photodiode PD until next reading is performed.

In the reading unit 50, the S1 signal is at a high level and the S2 signal is at a low level between time $t_{21}$ and time $t_{31}$. Also, in this period, in the N hold circuits $H_{1,1}$ to $H_{1,N}$, Hshift a1(n) and Hshift b1(n) are sequentially at a high level and the data held by each hold circuit $H_{1,n}$ is sequentially output to the reading signal line Hline1 and input to the reading unit 50. In the reading unit 50, after the Freset signal is at a high level and the input and output terminals of the amplifier $A_5$ are initialized, the data output from each hold circuit $H_{1,n}$ to the reading signal line Hline1 is input to the inversion input terminal of the amplifier $A_5$, and output data according to the input data is output from the non-inversion output terminal of the amplifier $A_5$ during a period when the Freset signal is at a low level. Also, in the AD conversion unit 51, the data output from the non-inversion output terminal of the amplifier $A_5$ is AD-converted and output as the data Dout.

FIG. 7 is a timing chart illustrating the operation (global shutter scheme) in the first operation mode of the solid-state imaging device 1 of this embodiment.

A period $T_1$ includes a period from time $t_{11}$ to time $t_{31}$. Data of each pixel unit $P_{1,n}$ in the first row is sampled by the hold circuit $H_{1,n}$ during a period from time $t_{11}$ to time $t_{16}$ in the above period, and the data held by each hold circuit $H_{1,n}$ is read as the data Dout through the reading unit 50 during a period from time $t_{21}$ to time $t_{31}$. In this case, the output data Dout indicates the amount of light incident on the photodiodes PD of the N pixel units $P_{1,1}$ to $P_{1,N}$ in the first row.

A period $T_2$ includes a period from time $t_{21}$ to time $t_{41}$. Data of each pixel unit $P_{2,n}$ in the second row is sampled by the hold circuit $H_{2,n}$ during a period from time $t_{21}$ to time $t_{26}$ in the above period, and the data held by each hold circuit $H_{2,n}$ is read as the data Dout through the reading unit 50 during a period from time $t_{31}$ to time $t_{41}$. In this case, the output data Dout indicates the amount of light incident on the photodiodes PD of the N pixel units $P_{2,1}$ to $P_{2,N}$ in the second row.

The same operation is repeated for each subsequent row, and the hold circuits $H_{1,n}$ and $H_{2,n}$ operate in parallel to alternately perform data sampling and alternately perform data output. The operation during each period $T_m$ is common except that the hold circuits $H_{1,n}$ and $H_{2,n}$ are used alternately. In the case of the global shutter scheme, in all of the M×N pixel units $P_{1,1}$ to $P_{M,N}$, the charge accumulated in the junction capacitance portion of the photodiode PD is transferred to and accumulated in the diffusion area (charge accumulation portion) connected to the gate terminal of the transistor T3 during a period $T_0$ (from time $t_{01}$ to time $t_{11}$) before the period $T_1$. An operation during the periods $T_0$ and $T_1$ will be described.

Each signal of Hold(1) to Hold(M) turns to a high level at time to, each signal of Reset(1) to Reset(M) turns to a low level at time $t_{02}$, each signal of Trans(1) to Trans(M) turns to a high level at time $t_{03}$, each signal of Hold(1) to Hold(M) turns to a low level at time $t_{04}$, and each signal of Reset(1) to Reset(M) turns to a high level at time $t_{11}$. Since each signal of Reset(1) to Reset(M) is at a low level and each signal of Trans(1) to Trans(M) and each signal of Hold(1) to Hold(M) is at a high level between time $t_{03}$ and time $t_{04}$, the charge accumulated in the junction capacitance portion of the photodiode PD is transferred to and accumulated in the diffusion area (charge accumulation portion) connected to the gate terminal of the transistor T3 in all of the M×N pixel units $P_{1,1}$ to $P_{M,N}$.

Thereafter, since each signal of Trans(1) to Trans(M) and each signal of Reset(1) to Reset(M) are at a high level between time $t_{11}$ and time $t_{21}$, the junction capacitance portion of the photodiode PD is discharged in all of the M×N pixel units $P_{1,1}$ to $P_{M,N}$ and the diffusion area (charge accumulation portion) connected to the gate terminal of the transistor T3 is discharged. Thereafter, each signal of Trans(1) to Trans(M) is at a low level and the charge generated in the photodiode PD according to light incidence in all of the M×N pixel units $P_{1,1}$ to $P_{M,N}$ is accumulated in the junction capacitance portion of the photodiode PD until next reading is performed.

The Address(1) signal turns to a high level at time $t_{11}$, the Set1 signal turns to a high level at time $t_{12}$, the Set1 signal turns to a low level at time $t_{13}$, and the Address(1) signal turns to a low level at time $t_{16}$. While the Address(1) signal is at a high level, the data according to the amount of charge accumulated in the diffusion area (charge accumulation portion) connected to the gate terminal of the transistor T3 in each of the N pixel units $P_{1,1}$ to $P_{1,N}$ in the first row is output to the reading signal line $L_n$ via the transistor T4 and input to the hold circuit $H_{1,n}$. Also, in the hold circuit $H_{1,n}$, the switches $SW_{31}$ and $SW_{34}$ turn to an opened state, and the data output to the reading signal line $L_n$ is sampled and held at time $t_{13}$ at which the Set1 signal turns to a low level.

In the reading unit 50, the S1 signal is at a high level and the S2 signal is at a low level between time $t_{21}$ and time $t_{31}$. Also, during this period, in the N hold circuits $H_{1,1}$ to $H_{1,N}$, Hshift a1(n) and Hshift b1(n) are sequentially at a high level and data held by each hold circuit $H_{1,n}$ is sequentially output to the reading signal line Hline1 and input to the reading unit 50. In the reading unit 50, the Freset signal is at a high level and the input and output terminals of the amplifier $A_5$ are initialized, and then, during a period in which the Freset signal is at a low level, data output from each hold circuit $H_{1,n}$ to the reading signal line Hline1 is input to the inversion input terminal of the amplifier $A_5$, and output data according to the input data is output from the non-inversion output terminal of the amplifier $A_5$. Also, in the AD conversion unit 51, data output from the non-inversion output terminal of the amplifier $A_5$ is AD-converted and output as the data Dout.

FIG. 8 is a timing chart illustrating an operation (rolling shutter scheme) in the second operation mode of the solid-state imaging device 1 of this embodiment.

During a period $T_1$, data of each pixel unit $P_{1,n}$ in the first row is sampled by the hold circuits $H_{1,n}$ and $H_{2,n}$ and data according to a difference between the data held by the hold circuits $H_{1,n}$ and $H_{2,n}$ is read as the data Dout through the reading unit 50. In this case, the output data Dout indicates an amount of light incident on the photodiodes PD of the N pixel units $P_{1,1}$ to $P_{1,N}$ in the first row.

During a period $T_2$ following the period $T_1$, data of each pixel unit $P_{2,n}$ in the second row is sampled by the hold circuits $H_{1,n}$ and $H_{2,n}$, and data according to a difference between the data held by the hold circuits $H_{1,n}$ and $H_{2,n}$ is read as the data Dout through the reading unit 50.

In this case, the output data Dout indicates the amount of light incident on the photodiodes PD of the N pixel units $P_{2,1}$ to $P_{2,N}$ in the second row.

The same operation is repeated for each subsequent row. An operation during each period $T_m$ is common. Hereinafter, an operation during the period $T_1$ will be described.

The Trans(1) signal turns to a low level, and the Address(1) signal turns to a high level at time $t_{101}$. The Reset(1) signal turns to a high level at time $t_{102}$, the Set1 signal turns to a high level at time $t_{103}$, the Reset(1) signal turns to a low level at time $t_{104}$, and the Set1 signal turns to a low level at time $t_{105}$. During this time, the Hold(1) signal remains at a high level. In each of the N pixel units $P_{1,1}$ to $P_{1,N}$, in the first row, the diffusion area (charge accumulation portion) connected to the gate terminal of the transistor T3 is in an initial state at time $t_{105}$ at which the Set1 signal turns to a low level, and the data output to the reading signal line $L_n$ via the transistor T4 is only a noise component. In the hold circuit $H_{1,n}$, the switches $SW_{31}$ and $SW_{34}$ turn to an opened state, and the data of only the noise component output to the reading signal line $L_n$ is sampled and held at this time $t_{105}$.

Thereafter, the Trans(1) signal turns to a high level at time $t_{106}$, the Set2 signal turns to a high level at time $t_{107}$, the Trans(1) signal turns to a low level at time $t_{108}$, and the Set2 signal turns to a low level at time $t_{109}$. During this time, the Hold(1) signal remains at a high level. In each of the N pixel units $P_{1,1}$ to $P_{1,N}$ in the first row, the charge accumulated in the junction capacitance portion of the photodiode PD is transferred to and accumulated in the diffusion area (charge accumulation portion) connected to the gate terminal of the transistor T3 while the Trans(1) signal is at a high level. The data according to an amount of accumulated charge is output to the reading signal line $L_n$ via the transistor T4. In the hold circuit Hg, the switches $SW_{31}$ and $SW_{34}$ turn to an opened state, and data output to the reading signal line $L_n$ is sampled and held at time $t_{109}$ at which the Set2 signal turns to the low level. This data is data in which a noise component overlaps a signal component.

The trans(1) signal and the Reset(1) signal are at a high level, the junction capacitance portion of the photodiode PD is discharged, and the diffusion area (charge accumulation portion) connected to the gate terminal of the transistor T3 in each of the N pixel units $P_{1,1}$ to $P_{1,N}$ in the first row is discharged between time $t_{110}$ and time $t_{111}$. Thereafter, the Trans(1) signal and the Reset(1) signal are at a low level and, in each of the N pixel units $P_{1,1}$ to $P_{1,N}$ in the first row, the charge generated in the photodiode PD according to light incidence is accumulated in the junction capacitance portion of the photodiode PD until next reading is performed.

In the reading unit 50, the S1 signal is at a high level and the S2 signal is at a low level between time $t_{109}$ and time $t_{201}$. Also, during this period, Hshift a1(n) and Hshift b1(n) in the N hold circuits $H_{1,1}$ to $H_{1,N}$ are sequentially at a high level and data (noise component) held by each hold circuit $H_{1,n}$ is sequentially output to the reading signal line Hline1 and input to the reading unit 50. Further, in parallel to this, Hshift a2(n) and Hshift b2(n) in the N hold circuits $H_{2,1}$ to $H_{2,N}$ are sequentially at a high level and data (signal component+ noise component) held by each hold circuit $H_{2,n}$ is sequentially output to the reading signal line Hline2 and input to the reading unit 50.

In the reading unit 50, after the Freset signal is at a high level and the input and output terminals of the amplifier $A_5$ are initialized, data (noise component) output from each hold circuit $H_{1,n}$ to the reading signal line Hline1 is input to the inversion input terminal of the amplifier $A_5$, data (signal component+noise component) output from the corresponding hold circuit $H_{2,n}$ to the reading signal line Hline2 is input to the non-inversion input terminal of the amplifier $A_5$, and output data according to the difference between the two pieces of input data is output as a differential signal from the inversion output terminal and the non-inversion output terminal of the amplifier $A_5$ during a period in which the Freset signal is at a low level. Also, in the AD conversion unit 51, the data output from the amplifier $A_5$ is AD-converted and output as the data Dout.

As described above, the hold circuits $H_{1,n}$ and $H_{2,n}$ of the holding unit 30 in the solid-state imaging device 1 of this embodiment operate in parallel to alternately perform data sampling and alternately perform data output in the first operation mode. Further, the reading unit 50 outputs the data Dout according to the amount of light incident on the photodiode PD of the pixel unit $P_{m,n}$ based on the data alternately output from the hold circuits $H_{1,n}$ and $H_{2,n}$ of the holding unit 30. Therefore, it is possible to achieve high-speed imaging in the first operation mode.

Further, the pixel unit $P_{m,n}$ of the light receiving unit 10 in the solid-state imaging device 1 of this embodiment outputs the data of the noise component at a first time and outputs the data according to an accumulation charge amount at a second time in the second operation mode. One of the hold circuits $H_{1,n}$ and $H_{2,n}$ of the holding unit 30 performs data sampling at the first time, and the other performs data sampling at the second time. Also, the reading unit 50 outputs the data Dout according to an amount of light incident on the photodiode PD of the pixel unit $P_{m,n}$ based on the difference between the data output from the respective hold circuits $H_{1,n}$ and $H_{2,n}$ of the holding unit 30. Therefore, it is possible to achieve highly precise imaging in the second operation mode.

The solid-state imaging device 1 of this embodiment can realize the operation in each of the first operation mode (high-speed imaging) and the second operation mode (highly precise imaging) using a common configuration, and thus can suppress increase in circuit scale.

The present invention is not limited to the embodiments described above, and various modifications may be made to the embodiments. For example, a reading unit 50A may be provided in place of the reading unit 50, as in a modification example illustrated in FIG. 9. The reading unit 50 illustrated in FIG. 2 includes the switches $SW_{55}$ to $SW_{58}$ as an output switching unit that switches a connection between the non-inversion output terminal and the inversion output terminal of the amplifier $A_5$ and the first input terminal $51_1$ and the second input terminal $51_2$ of the AD conversion unit 51. On the other hand, the reading unit 50A illustrated in FIG. 9 includes switches $SW_{55}$ to $SW_{58}$ as an input switching unit that switches a connection between the hold circuits $H_{1,n}$ and $H_{2,n}$ of the holding unit 30 and the inversion input terminal and the non-inversion input terminal of the amplifier $A_5$.

Figure 9:
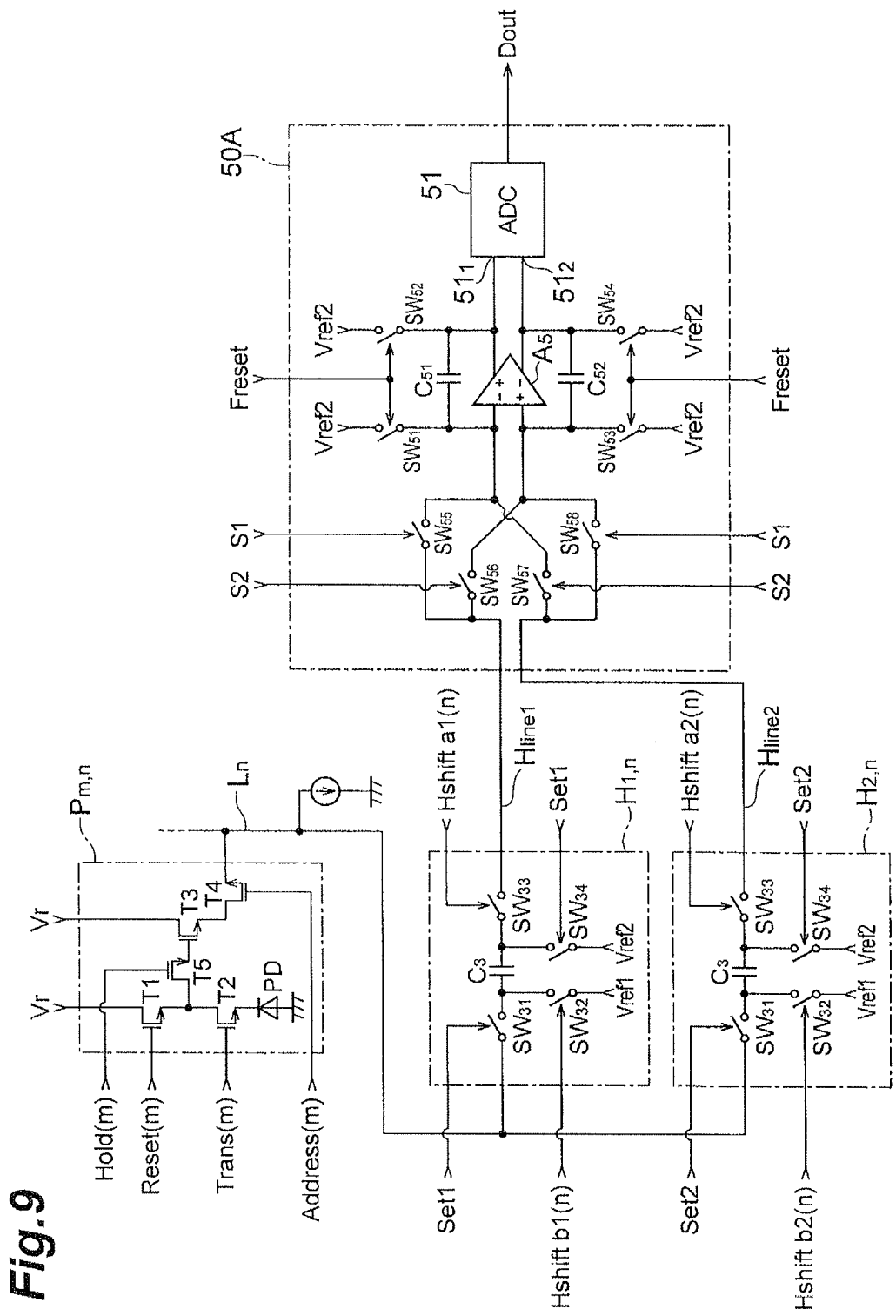
FIG. 9 is a diagram illustrating a modification example of the circuit configuration of the solid-state imaging device 1 of this embodiment.

However, in the reading unit 50A illustrated in FIG. 9, since the input switching unit is provided on the input side of the amplifier $A_5$, parasitic capacitance or parasitic resistance increases, and this is disadvantageous in speedup of the operation. From the viewpoint of the speedup of the operation, the output switching unit may be provided on the output side of the amplifier $A_5$, as in the reading unit 50 illustrated in FIG. 2.

Further, ± sign processing may be performed on the digital data Dout output from the AD conversion unit 51 in the first operation mode without providing both of the output switching unit and the input switching unit.

Effects of speedup of the imaging are remarkable when there is a small number of pixels in a row direction, and remarkable when there is a small number of columns of reading pixels. That is, since an operation of sampling the output data from each pixel unit of the light receiving unit 10 using the holding unit 30 is performed on each row, time required at that time does not depend on the number of pixels in a column direction. In contrast, an operation of outputting, from the reading unit 50, the output data from the holding unit 30 is substantially proportional to the number of pixels in a column direction. Therefore, in the first operation mode, for some of the N columns of the light receiving unit 10, the hold circuits $H_{1,n}$ and $H_{2,n}$ of the holding unit 30 operate in parallel to alternately perform data sampling and alternately perform data output, and the reading unit 50 outputs the data Dout according to the amount of light incident on the photodiode of the pixel unit $P_{m,n}$ based on the data alternately output from the hold circuits $H_{1,n}$ and $H_{1,n}$ of the holding unit 30, thereby achieving higher-speed imaging.

In the first operation mode, the data of the pixel unit may be read for some of the M rows of the light receiving unit 10. Further, in the second operation mode, the data of the pixel unit may be read for some of the M rows of the light receiving unit 10 or some of the N columns of the light receiving unit 10.

The present invention is applicable to not only a case in which M≥2 (that is, the M×N pixel units $P_{1,1}$ to $P_{M,N}$ are two-dimensionally arranged), but also a case in which M=1 (that is, the 1×N pixel units $P_{1,1}$ to $P_{1,N}$ are one-dimensionally arranged).

INDUSTRIAL APPLICABILITY

The present invention is applicable to use of the solid-state imaging device capable of achieving both of highly precise imaging and high-speed imaging and suppressing increase in circuit scale.

REFERENCE SIGNS LIST 1 solid-state imaging device
10 light receiving unit
20 row selection unit
30 holding unit
40 column selection unit
50 reading unit
60 control unit
$P_{1,1}$ to $P_{M,N}$ pixel unit
$H_{1,1}$ to $H_{2,N}$ hold circuit

The invention claimed is:

1. A solid-state imaging device comprising:

a light receiving unit including M×N pixel units $P_{1,1}$ to $P_{M,N}$ arranged in M rows and N columns, each pixel unit $P_{m,n}$ including a photodiode that generates an amount of charge according to an amount of incident light, and a charge accumulation portion that accumulates the charge, and the light receiving unit outputting data according to an accumulation charge amount in the charge accumulation portion;

a holding unit including 2N hold circuits $H_{1,1}$ to $H_{2,N}$, each of the hold circuits $H_{1,n}$ and $H_{2,n}$ sampling, holding and outputting data output from any one of the M pixel units $P_{1,n}$ to $P_{M,n}$ on an $n^{th}$ column of the light receiving unit; and a reading unit configured to receive data output from both or one of the hold circuits $H_{1,n}$ and $H_{2,n}$ of the holding unit, and output data according to an amount of light incident on the photodiode of the pixel unit $P_{m,n}$ based on the received data;

wherein, in a first operation mode, the hold circuits $H_{1,n}$ and $H_{2,n}$ of the holding unit operate in parallel to alternately perform data sampling and alternately perform data output, and the reading unit outputs the data according to an amount of light incident on the photodiode of the pixel unit $P_{m,n}$ based on the data alternately output from the hold circuits $H_{1,n}$ and $H_{2,n}$ of the holding unit, and wherein, in a second operation mode, the pixel unit $P_{m,n}$ of the light receiving unit outputs data of a noise component at a first time and output data according to the accumulation charge amount at a second time, one of the hold circuits $H_{1,n}$ and $H_{2,n}$ of the holding unit performs to data sampling at the first time and the other to perform data sampling at the second time, and the reading unit outputs the data according to an amount of light incident on the photodiode of the pixel unit $P_{m,n}$ based on a difference between the data output from the respective hold circuits $H_{1,n}$ and $H_{2,n}$ of the holding unit (where M is an integer equal to or more than 1, N is an integer equal to or more than 2, m is an integer ranging from 1 to M, and n is an integer ranging from 1 to N), and wherein the reading unit includes:

an amplifier including an inversion input terminal, a non-inversion input terminal, an inversion output terminal and a non-inversion output terminal, the amplifier receiving data output from one of the hold circuits $H_{1,n}$ and $H_{2,n}$ of the holding unit at the inversion input terminal and receiving data output from the other at the non-inversion input terminal, a first capacitor provided between the inversion input terminal and the non-inversion output terminal of the amplifier, and a second capacitor provided between the non-inversion input terminal and the inversion output terminal of the amplifier, wherein the reading unit is configured to initialize a potential of each of the inversion input terminal and the non-inversion output terminal of the amplifier, and is configured to initialize wherein a potential of each of the non-inversion input terminal and the inversion output terminal of the amplifier.

2. The solid-state imaging device according to claim 1, wherein, for some of N columns of the light receiving units, in the first operation mode, the hold circuits $H_{1,n}$ and $H_{2,n}$ of the holding unit to operate in parallel to alternately perform data sampling and alternately perform data output, and the reading unit to output the data according to an amount of light incident on the photodiode of the pixel unit $P_{m,n}$ based on the data alternately output from the hold circuits $H_{1,n}$ and $H_{2,n}$ of the holding unit.

3. The solid-state imaging device according to claim 1, wherein the reading unit further includes an input switching unit that switches a connection between the hold circuits $H_{1,n}$ and $H_{2,n}$ of the holding unit and the inversion input terminal and the non-inversion input terminal of the amplifier.

4. The solid-state imaging device according to claim 1, wherein the reading unit further includes an AD conversion unit that has a first input terminal and a second input terminal, receives the data output from one of the non-inversion output terminal and the inversion output terminal of the amplifier at the first input terminal, receives the data output from the other at the second input terminal, and outputs a digital value according to a difference between the data input at the first input terminal and the second input terminal.

5. The solid-state imaging device according to claim 4, wherein the reading unit further includes an output switching unit that switches a connection between the non-inversion output terminal and the inversion output terminal of the amplifier and the first input terminal and the second input terminal of the AD conversion unit.

* * * * *